United States Patent [19]

Coufal

[11] 4,350,211
[45] Sep. 21, 1982

[54] ADJUSTABLE PATTERN CULTIVATOR

[76] Inventor: Edward J. Coufal, Rte. 3, Temple, Tex. 76501

[21] Appl. No.: 83,818

[22] Filed: Oct. 11, 1979

[51] Int. Cl.³ .......................................... A01B 73/00
[52] U.S. Cl. ................................. 172/311; 172/446; 172/741
[58] Field of Search ............... 172/311, 456, 446, 451, 172/662, 310, 439, 443, 47, 248, 741; 280/411 R, 411 A, 446 A, 456 A, 460 A, 461 A, 639, 656, 415 A; 111/69

[56] References Cited

U.S. PATENT DOCUMENTS

| | | | |
|---|---|---|---|
| 2,263,652 | 11/1941 | Silver | 111/69 |
| 2,645,989 | 7/1953 | Prince | 172/451 X |
| 3,211,238 | 10/1965 | McClenny | 172/456 |
| 3,354,966 | 11/1967 | Jackson | 172/311 |
| 3,373,822 | 3/1968 | Hornung | 172/311 |
| 3,502,154 | 3/1970 | Rogers | 172/311 |
| 3,658,361 | 4/1972 | Van Wyk | 280/411 A |
| 3,783,951 | 1/1974 | Gugin | 172/311 |
| 3,967,684 | 7/1976 | Haverdink | 172/311 |
| 4,050,522 | 9/1977 | Ralston et al. | 172/311 |
| 4,178,009 | 12/1979 | Worick | 280/411 A |
| 4,194,573 | 3/1980 | Rettkowski | 172/662 X |
| 4,206,815 | 6/1980 | Hatcher | 172/311 |
| 4,236,587 | 12/1980 | Shader et al. | 172/456 X |

FOREIGN PATENT DOCUMENTS

| | | | |
|---|---|---|---|
| 2315212 | 1/1977 | France | 172/311 |
| 813809 | 5/1959 | United Kingdom | 172/451 |
| 491335 | 2/1976 | U.S.S.R. | 172/311 |
| 549095 | 5/1977 | U.S.S.R. | 172/311 |

Primary Examiner—Richard T. Stouffer
Attorney, Agent, or Firm—Hubbard, Thurman, Turner, Tucker & Glaser

[57] ABSTRACT

An implement for general purpose broadcast or precision row crop cultivation comprising a central frame and two hingedly connected wings, or outer frames, all adapted for attachment of plow shanks at essentially any lateral position. The center frame includes cantilevered gauge wheel mounts extending beyond the hinge region so that gauge wheels for the center section are positioned in front of the side sections. Additional gauge wheels are carried by the wing sections at their ends opposite the center section. Hydraulic cylinders are provided for lifting the wing sections to an upright transporting position and latches are provided on the center section for holding the wing sections upright when the hydraulic cylinders are deactivated. Three point hitch members are provided on the front edge of the center section adapted for connection to standard tractor three point hitches with the cultivator spaced very closely to the rear of the tractor. Braces, hitches and gauge wheel connections are made by bolting to the frame cross members so that each part may be adjusted as necessary to accommodate essentially any plow shank pattern.

8 Claims, 6 Drawing Figures

ADJUSTABLE PATTERN CULTIVATOR

BACKGROUND OF THE INVENTION

The present invention relates to cultivating implements and more particularly to an implement adapted for both general purpose broadcast and precision row crop cultivation.

A number of field implements are commonly employed in preparation of fields for planting and in cultivating row crops. Plows, discs and harrows are commonly used in field and seed bed preparation but are generally not suitable for cultivation after a row crop has been planted. Some types of chisel plows or harrows employ plow shanks or points similar to those used on row crop cultivators but the implements do not provide sufficient flexibility in spacing of plow shanks or in control of plowing depth to allow use of such implements for row crop cultivation. As a result, the row crop farmer is generally required to purchase two separate implements for the initial seed bed preparation and the row crop cultivation. That is, in final seed bed preparation, an implement having evenly spaced plow shanks and possibly including a harrow is generally used for final smoothing and pulverizing of the field surface. For row crop cultivation, the plow shank spacing must be arranged to conform to the row width which is commonly twenty-eight, thirty-eight or forty inches. A number of plow shanks, generally five, are desirably positioned between each crop row with a sufficient gap provided to avoid damage to the crop.

Broadcast cultivators of the type having flexible wings are known. Such cultivators generally have a central section of a width which may be transported on public roadways and which can pass through normal gate openings. Wings are generally hingedly connected to the central section so that they may be raised to an upright position for transportation or lowered to a horizontal position for use of the implement in the field. Such implements generally are provided with a hitch on the central section for connection to a conventional tractor three point hitch and with gauge wheels carried on the ends of the wings. Plowing or cultivation depth of the central section is controlled by the tractor operator's selection of hitch position. Depth of the wings is controlled by a combination of the gauge wheel position and the position of the central section. Such arrangements are generally suitable for the open field or broadcast type seed bed preparation but do not provide the precise depth control required when cultivating row crops. Thus, even if the plow shanks on such a device could be arranged in an appropriate pattern for row crop cultivation, the lack of depth control would make such a device unsuitable for such use.

Thus, it is seen that it is desirable to provide a single implement adaptable for efficient use as both an open field broadcast cultivator and a precision row crop cultivator.

SUMMARY OF THE INVENTION

Accordingly, an object of the present invention is to provide a field implement of the type having hinged wing sections and also having means for adjusting plow shanks to positions suitable for both broadcast preparation and row crop cultivation.

Another object of the present invention is to provide a field implement having gauge means on both a central section and on wing sections to provide precise depth control required for row crop cultivation.

Another object of the present invention is to provide a field implement of the type having folding wings in which plow shanks may be attached at essentially any lateral position including the location of hinge means connecting wing sections to the center section.

These and other objects of the present invention are achieved by providing a field implement having a central frame and a pair of hingedly connected wing frames each comprising three elongated tubular members connected at their ends by cross bars. Narrow hinge means are provided between adjacent cross bars of the center section and wing sections and means are provided for raising the wing sections to an upright position for transporting the implement. A pair of gauge wheel mounts are attached to the front edge of the central frame and extend outwardly in front of the wing frames and carry, on the outwardly extending portion, a pair of gauge wheels for controlling the cultivating depth of the central frame. Each wing frame additionally carries a gauge wheel on its end opposite the central frame. Simple three point hitch means comprising angle irons bolted to the central frame are provided on the front edge of the central frame and extend a minimal distance from the frame so that the implement is carried as closely as possible to the tractor. The hitch, gauge wheels, and other bracing members are all connected to the frame by bolting so that interference with desired plow shank positions can be avoided by appropriate repositioning of the various members.

BRIEF DESCRIPTION OF THE DRAWINGS

The present invention may be better understood by reading the following detailed description of the preferred embodiments with reference to the accompanying drawings wherein.

DESCRIPTION OF THE PREFERRED EMBODIMENTS

Figure 1:
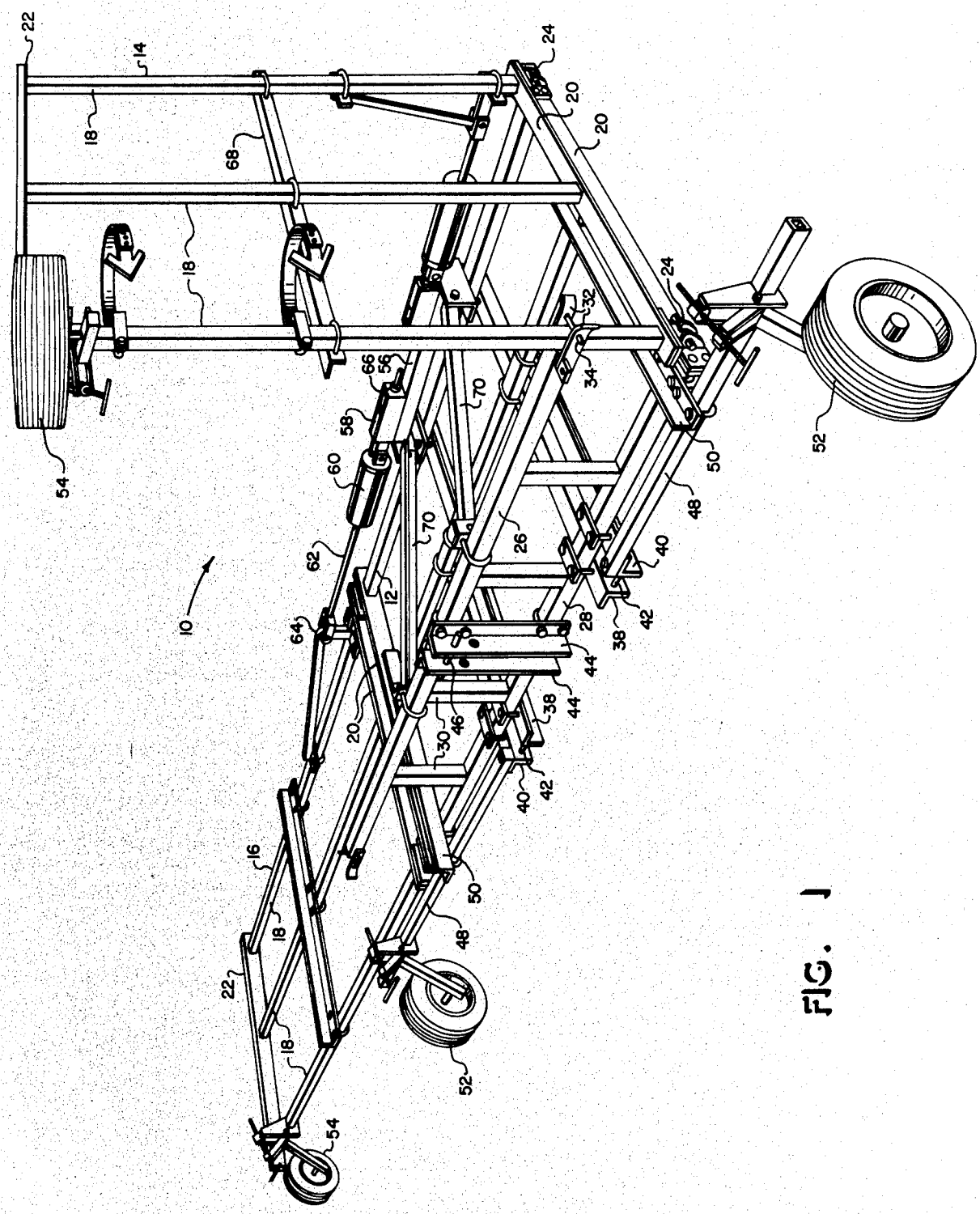
FIG. 1 is a perspective view of a field implement according to the present invention having one wing in a folded position and one in an operating position.

With reference now to FIG. 1, there is provided a perspective view of a field implement according to the present invention designated generally 10. The implement 10 comprises a central frame or section 12, a right wing or frame section 14, shown in transporting position, and a left wing or frame section 16, shown in operating position. Each of the frames 12, 14 and 16 comprises three elongated tubular members 18 connected at their ends by cross bars such as bars 20 and 22. In the preferred form, bars 20 are formed from solid half-inch thick steel plate while the cross bars 22 are of hollow tubular stock similar to the tubular members 18. Hinges 24, more details of which are shown below, are provided between the cross bars 20 to link the wing sections 14 and 16 to the central section 12 with only a very narrow gap.

An additional tubular member 26 is carried above a first or front tubular member 28 of the central frame 12. A number of vertical bars or struts 30 are welded between the tubular members 26 and 28 to hold them in position. A latch for holding the wing sections 14 and 16 in an upright position is provided on each end of the tubular member 26. This latch comprises a pair of arms 32 extending from front and back faces of the member 26 and a pin 34 positioned through apertures in each of the arms 32. As illustrated with respect to the wing section 14 in FIG. 1, the arms 32 are positioned on opposite sides of a first tubular member of frame 14 when it is in its upright position so that the pin 34 locks the frame into the upright position.

Three point hitch means adapted for connection to standard three point tractor hitches is provided on the front edge of the central frame 12. Lower hitch points are provided by means of a pair of long angle iron pieces 38 and a pair of shorter angle iron pieces 40. The long pieces 38 are bolted to the lower surface of all three of the tubular members of central frame 12. The shorter hitch pieces 40 are spaced from the long sections 38 and are bolted to only the forward two tubular sections 18 of central frame 12. One and one-eighth inch diameter holes are provided in the forward ends of angle iron pieces 38 and 40 to accomodate pins 42 for linking to the standard lower hitch points of three point tractor hitches. A pair of vertically positioned angle irons 44 are bolted to the tubular members 26 and 28 of frame 12 to provide an upper hitch point. A pair of one inch diameter apertures are provided near the upper end of pieces 44 to receive a pin 46 for linking to the upper hitch point of a standard tractor three point hitch. An extra set of holes are provided in pieces 44 to accommodate hitches for various types of tractors. In similar fashion, various lateral spacings between lower hitch points are preferably accommodated by providing pins 42 and corresponding spacing between pieces 38 and 40 of a greater dimension than is required for a given hitch.

A pair of tubular mounts 48 are positioned parallel to the forward tubular member 28 of frame 12 and in front of the frame 12. One end of each of the mounts 48 is connected to angle iron 40. Angle iron braces 50 attached to the top surfaces of the forward two tubular members of frame 12 are connected to a central portion of mounts 48 to hold the mounts in a desired position. A second end of mount 48 extends outwardly to a position in front of each of the wings 14 and 16 respectively when they are in their operating position. A first pair of gauge wheels 52 are bolted to the extended ends of mounts 48 so that they are positioned in front of the wings 14 and 16 near the inboard ends of the wings. The gauge wheels 52 control the vertical position of frame 12 and thereby, control cultivation depth. Gauge wheels 52 are bolted to the mounts 48 and may be adjusted transversely so that their positions are in alignment with spaces between crop rows. A second pair of gauge wheels 54 are carried on the forward or first tubular members of each of the wings 14 and 16. Wheels 54 are bolted to the lateral tubular members and are positioned near the outboard ends of the wings but are adjustable to be positioned between crop rows. The gauge wheels 54 are adjustable in vertical height to control the vertical spacing of the wings 14 and 16 in cooperation with the gauge wheels 52.

The frames 12, 14 and 16 carry means for lifting the frames 14 and 16 vertically for the transporting operation. A hydraulic cylinder mount 56 is carried on top of the third tubular member of central frame 12. Mount 56 includes a laterally adjustable fitting 58 on each end having a link on its outboard end for connection to hydraulic cylinders 60. Extendable shafts 62 of cylinders 60 are linked to hydraulic cylinder wing supports 64 on each of the wings 14 and 16. When the hydraulic cylinders 60 are actuated, the shafts 62 are withdrawn fully into the cylinder and the corresponding wings are lifted to an upright position such as that shown by wing 14. When a hydraulic cylinder 60 is deactiviated, the corresponding wing is allowed to be lowered to the operating position in which wing 16 is illustrated. The link 58 is adjustable by means of a threaded shaft and nut arrangement 66 to control the maximum downward extension of the wings 14 and 16. During cultivation operations, the cylinders 60 are deactivated so that when wings 14 or 16 encounter a relatively high spot in the field, the gauge wheels 54 can lift the wings above this maximum downward position.

Various brace members are also provided on the various portions of the cultivator to increase the strength of the whole device. Thus, a brace 68 is bolted to each of the tubular members 18 of frame 14. Brace 68 is bolted by means of U bolts and may be moved laterally to accommodate desired positions of plow shanks. Braces 70 extend from the tubular member 26 of frame 12 to the hydraulic cylinder mount 56 at the rear of frame 12.

Figure 2:
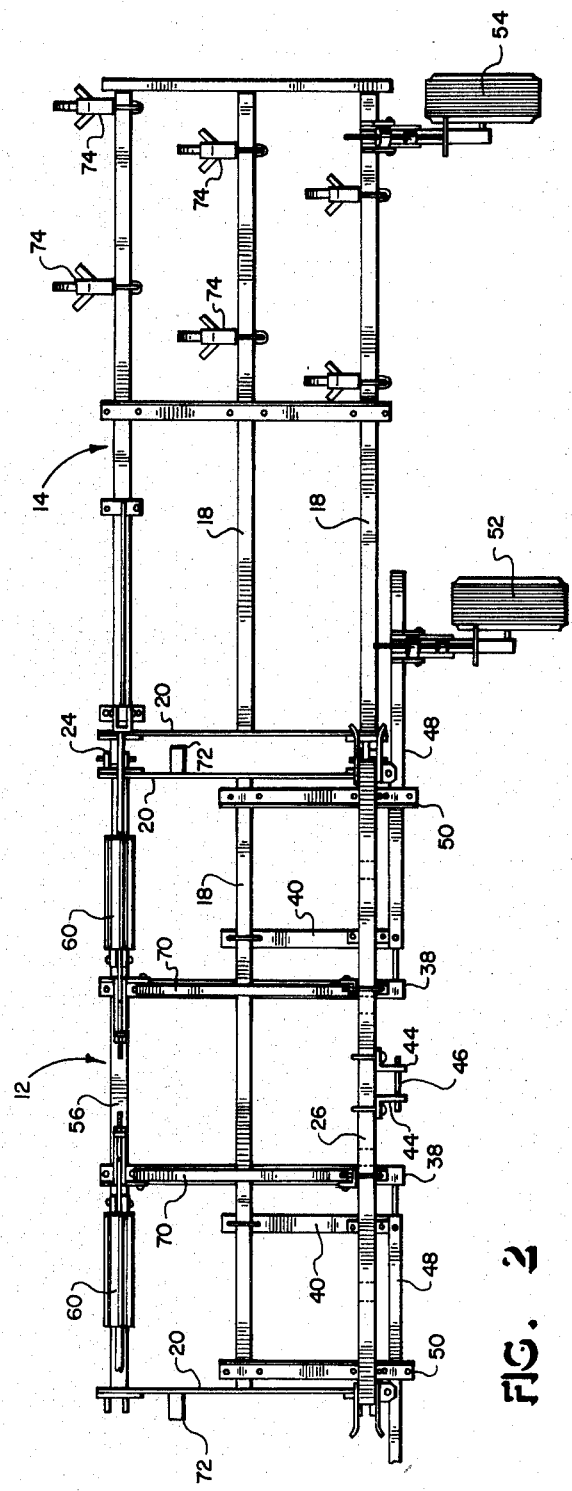
FIG. 2 is a plan view of the center section and one wing of an implement according to the present invention showing various details of the structure.

With reference now to FIG. 2, more details of the apparatus of FIG. 1 are illustrated in a plan view of the central frame 12 and the right wing 14. Elements which appear in both FIGS. 1 and 2 carry the same designation numbers. Details which are more clearly illustrated in this figure include the alignment of the lateral tubular members 18 of the central and wing frames. In addition, the hinge 24 of this embodiment is more clearly seen to include a two arm portion bolted to the central frame 12 and a single arm portion bolted to the wing 14. Two hinges are preferrably provided in alignment with the forward and rear tubular members. In the preferred form, the total space required for hinges 24 between the cross bars 20 is about four inches. Since the cross bars 20 are preferably made from half-inch steel stock, a total of only five inches is required for the entire hinge arrangement. In the preferred embodiment, short stubs 72 of tubular stock, essentially identical to that from which tubular members 18 are formed, are provided on the cross bars 20 of central frame 12. The stubs 72 are positioned forward of the rear hinge 24 and provide a mounting position for plow shanks which for a preferred plow arrangement may desirably be positioned at the hinge location. Examples of such use can be seen with reference to FIGS. 4, 5 and 6.

Also, more clearly seen in FIG. 2 is the alignment of the mounting plates of the hydraulic cylinder mount 56 with the longer angle iron pieces 38 of the three point hitch arrangement. A number of conventional plow shanks 74 are illustrated bolted to the tubular members 18 at various locations. One of the advantages of the present invention is that the plow shanks 74 may be provided at essentially any lateral position on the implement by proper selection of forward, middle or rear tubular members and/or by repositioning other elements of the implement such as brace 68 or even the hitch angle irons 38, 40 and 44.

Figure 3:
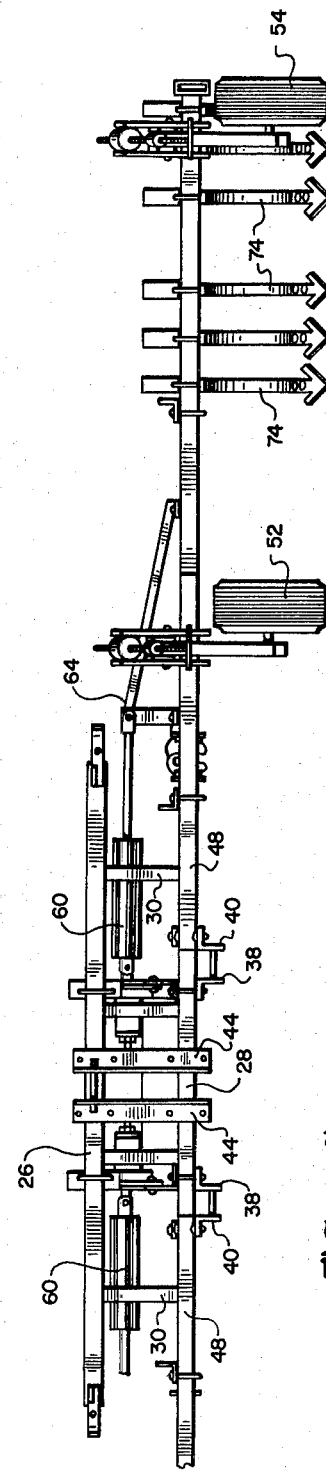
FIG. 3 is a front view of the implement illustrated in FIG. 2.

With reference now to FIG. 3, a front view of the apparatus of FIG. 2 is provided. Like parts again carry the same designation numbers. Again, more details of the hitch arrangement and positioning of the lifting means comprising the hydraulic cylinders 60 and wing support 64 are provided. Also, the spacing of the fourth tubular member 26 of the central frame 12 from the forward main tubular member 28 by struts 30 is well illustrated.

With reference to FIGS. 1, 2 and 3, it can be seen that, when in operating position, the cultivating implement of the present invention can provide a relatively wide cultivating swath. In the preferred form, central frame 12 is 8'3" wide including the cross bars 20. The wing sections 14 and 16 are 8'8½" wide including cross bars 20 and 22. The hinges occupy a total space of 8 inches so that the overall width of the entire implement in its operating position is 26'4". For common crop row spacing, this implement, therefore, allows the cultivation of about 8 rows simultaneously. The tubular members 18 are preferably formed from square cross section steel stock having an edge dimension of three inches conforming to commonly available plow shanks which may be attached by means of U bolts.

Figure 4:
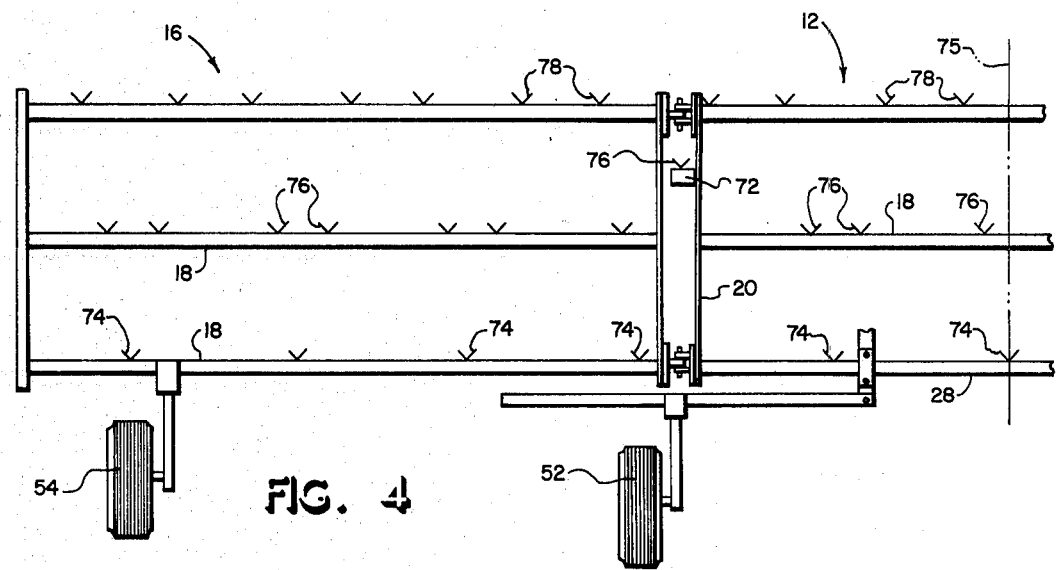
FIGS. 4, 5 and 6 are plan views of a wing frame and a portion of the central frame of an implement according to the present invention illustrating plow shank attachment points adapted for cultivating row crops with conventional twenty-eight, thirty-eight and forty inch spacings respectively.
Figure 5:
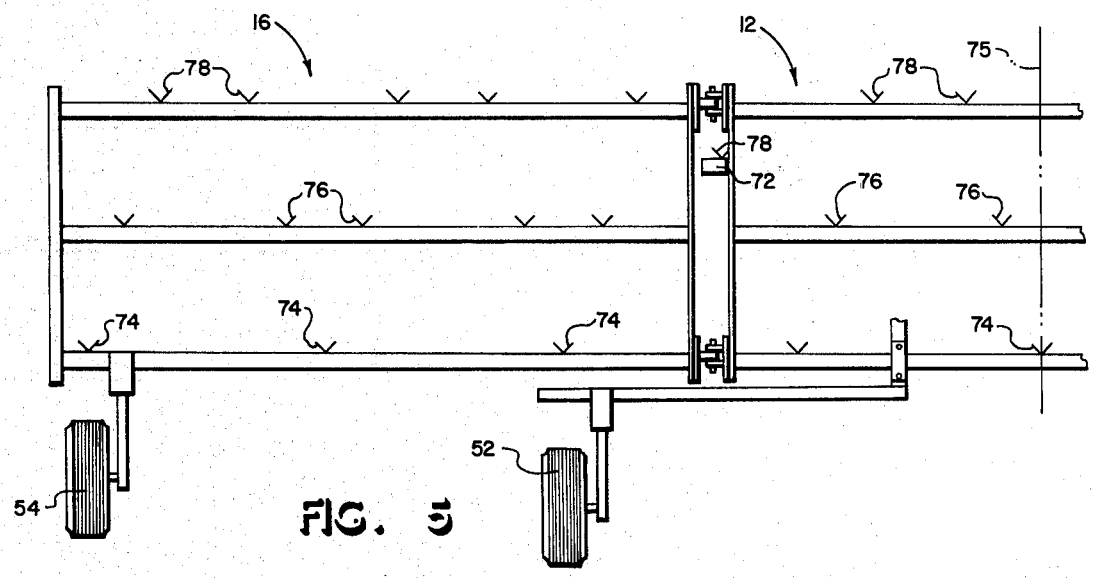
Figure 6:
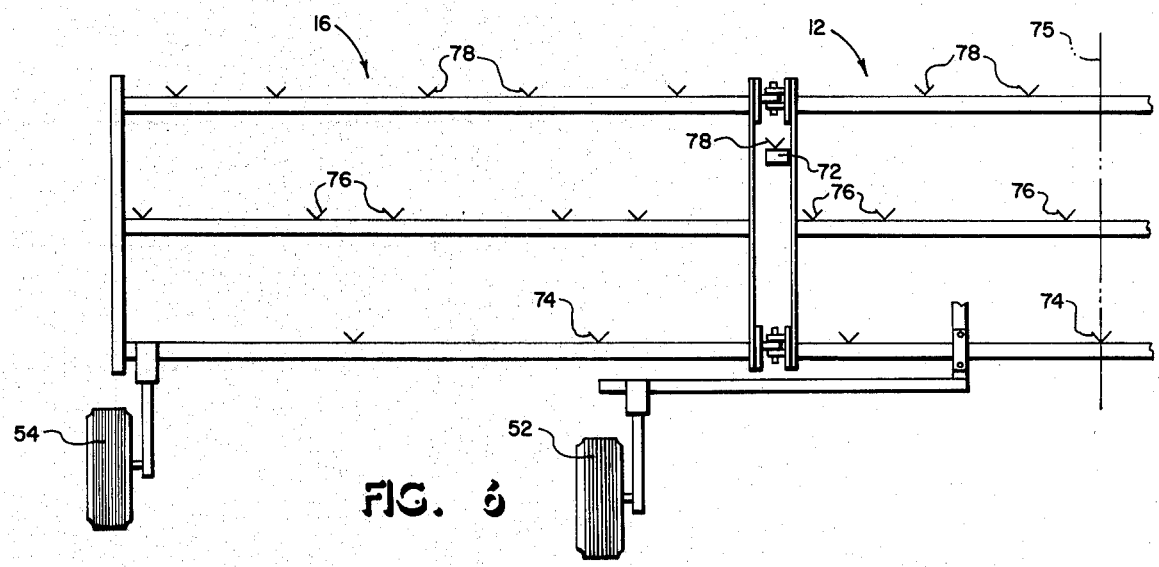

With reference now to FIGS. 4, 5 and 6, there are provided plan views of the left wing 16 and half of the central wing 12 showing primarily only the longitudinal tubular members 18 and positioning of plow shanks for various crop row spacings. In FIG. 4, for example, plow shank spacing for cultivating crop rows spaced twenty-eight inches is provided. Thus, assuming that the center of the implement will be positioned over the space between the two center rows being cultivated, a plow shank 74 will be positioned at the center line 75 of the implement. Additional plow shanks 74 are positioned along the forward tubular member 28 at twenty-eight inch spacing corresponding to the distance between crop rows. In the FIG. 4 arrangement, five plow shanks are provided between adjacent crop rows. Thus, on the second tubular member 18, plow shanks 76 are positioned laterally displaced four inches on each side of the plow shanks 74 on the first tubular member. In similar fashion, plow shanks 78 are positioned on the third tubular member 8 inches outboard of each of the plow shanks 74 on the leading tubular members of the frames. The shanks 74, 76 and 78 are therefore, positioned in wedge-shaped patterns aligned between the crop rows. Gauge wheels 52 and 54 can also be seen to be adjusted to ride between adjacent crop rows. One of the plow shanks 76 is seen to be positioned on the stub 72 carried on cross bar 20 of frame 12. The stub 72 thereby allows the continuation of the cultivator pattern through the hinge area.

With reference to FIG. 5, the positioning of plow shanks 74, 76 and 78 for cultivating crop rows spaced thirty-eight inches apart are illustrated. Plow shanks 74 on the first row are again positioned thirty-eight inches apart with a central shank positioned on center line 75. Shanks 76 on the second row are positioned six inches outboard of the corresponding shanks 74 on the first row. In similar fashion, shanks 78 on the third tubular member are positioned another 6 inches outboard of shanks 76 on the second row. Again, it is seen that the gauge wheels 52 and 54 are adjusted to correspond to spaces between adjacent crop rows and thereby to correspond to locations of appropriate shanks 74 on the first tubular member. Again, one of the shanks 78 is positioned on stub 72 carried on a cross bar to complete the pattern.

Finally, with reference to FIG. 6, a third arrangement of plow shanks corresponding to crop row spacings of forty inches is illustrated. Shanks 74 again are positioned on the first tubular member beginning at center line 75 and spaced forty inches apart throughout the entire implement. Shanks 76 positioned on the second tubular member are spaced 6 inches on either side of corresponding shanks 74 on the first tubular member. Shanks 78 on the third member are again spaced an additional six inches outboard of the corresponding shanks 76 on the second tubular member. Again, one of the shanks 78 is carried on the stub 72 to complete the pattern which includes one plow shank in the hinge area. Gauge wheels 52 and 54 are again positioned to be aligned between adjacent crop rows.

It is understood that in each of the FIGS. 4, 5 and 6, the opposite half of the implement which is not illustrated is a mirror image of the illustrated portion. For the common thirty-eight and forty inch row spacings, therefore, eight rows are cultivated on each pass of the implement. With the twenty-eight inch spacings of FIG. 4, a total of ten rows may be cultivated upon each pass.

From the above description of the preferred embodiment of the present invention, the various uses of this implement are apparent. Thus, for open field or broadcast cultivation or seed bed preparation, plow shanks 74 may be positioned along the tubular members 18 in a generally even distribution. For example, a staggered pattern like that shown partially in FIG. 2 may be used. The gauge wheels 52 and 54 may be positioned at any convenient location. Gauge wheels 52 are generally positioned outboard of the tractor wheels. The implement is attached to the standard three point hitch arrangement on a tractor and once the gauge wheel height is properly adjusted, the hydraulic control of the hitch may be deactivated. The three point hitch on the tractor therefore, acts merely to maintain the implement parallel with the ground surface while the gauge wheels 52 and 54 provide a desired ground clearance.

The implement may be converted to row crop cultivation by rearranging the plow shanks and gauge wheels in one of the patterns of FIGS. 4, 5 or 6 or in any other convenient pattern according to the particular crop row spacing. For unusual spacings, most of the brace elements of the present implement may be adjusted to allow placement of shanks at essentially any position along the tubular members 18. In the event that it is desired to provide a shank on the front tubular member of central frame 12 at one of the locations of struts 30, a hole may be provided through the appropriate strut to accomodate a U bolt to hold a shank in place.

The use of cantilevered gauge wheel mounts 48 allows the attachment of gauge wheels to the central frame 12 and simultaneously allows the use of very short three point hitch couplings to place the implement as closely as possible to the rear of a tractor. This spacing of the implement from the tractor minimizes torque applied to the hitch by the implement and allows more accurate cultivating. The spacing of the gauge wheels outboard of the central section prevents interference between gauge wheels 52 and the drive wheels of the tractor which are spaced very closely to the front edge of the implement. This cantilevered arrangement of gauge wheels 52 thereby provides a desired improvement in accuracy by use of gauge wheels with the central section of the winged cultivator without requiring the spacing of the cultivator farther from the tractor which could reduce cultivating accuracy and reduce the advantage of the additional gauge wheels.

While the present invention has been illustrated and described with reference to particular apparatus, it is apparent that various modification and changes can be made within the scope of the present invention as defined by the appended claims.

I claim:

1. An implement for broadcast and row crop cultivation comprising:

first, second and third frames each defined by first and second elongated tubular members spaced apart and extending parallel to each other, and cross bars rigidly interconnecting adjacent ends of said tubular members of each of said frames;

three point hitch means connected to said second frame for connection of said implement to a tractor, said hitch means defining a forward end of said implement and said hitch means being adapted to position the forward edge of said second frame adjacent to and rearwardly of the drive wheels of said tractor;

hinge means connected to adjacent ones of said cross bars of said first and second frames and to adjacent ones of said cross bars of said second and third frames to hingedly connect said first and third frames to said second frame with said tubular members of said frames generally in alignment with each other;

first and second elongated tubular mounts spaced forward of said second frame and having respective first ends rigidly connected to said second frame, said tubular mounts having respective cantilever second ends extending, respectively, in opposite directions generally parallel to said tubular members and laterally with respect to the normal direction of towing of said implement from said second frame beyond said hinge means to points spaced forwardly from said first tubular members of said first and third frames;

first and second gauge wheels slidably carried on said second ends of said first and second tubular mounts and adapted to be selectively positioned on said first and second tubular mounts along said second ends including laterally outboard of said second frame;

third and fourth gauge wheels slidably carried on said first and third frames and positioned at the respective ends of said first and third frames opposite said second frame; and a plurality of plow shanks carried by said tubular members of said frames and spaced along said tubular members at positions selected according to a preselected mode of cultivation.

2. An implement according to claim 1 wherein:

said cross bars of said second frame and said cross bars of said first and third frames adjacent said second frame have a thickness of about 0.5 inches and are spaced apart by said hinge means by about four inches whereby plow shanks may be attached to said tubular members at about six inch intervals at essentially all positions along the length of said implement.

3. An implement according to claim 2 wherein:

each of said first, second and third frames includes a third tubular member disposed between and extending parallel to said first and second tubular members;

at least one tubular stub is attached to one of adjacent cross bars of said first and second frames and said second and third frames intermediate one of said first, second and third tubular members and intermediate said hinge means, said at least one stub having a length less than the spacing between adjacent cross bars of said first and second and second and third frames, whereby at least one plow shank may be positioned at the locations of said hinge means.

4. An implement according to claim 1 wherein said second frame member further includes:

a fourth tubular member spaced vertically above said first tubular member of said second frame, said first and fourth tubular members connected by a plurality of vertical struts, and latch means carried on each end of said fourth tubular member for engaging said first tubular member of said first and third frames and holding said first and third frames in an upright position for transporting said implement.

5. An implement according to claim 4 wherein said three point hitch means comprises:

a pair of lower hitch means each comprising first and second angle iron pieces bolted to at least first and second tubular members of said second frame, sad first and second pieces each extending in front of said second frame and having aligned apertures for receiving a pin for linking to a tractor lower hitch point; and an upper hitch point means comprising third and fourth angle iron pieces bolted to said first and fourth tubular members of said second frame and having aligned apertures at upper ends for receiving a pin for linking to a tractor upper hitch point.

6. An implement according to claim 1 further including means for lifting said first and third frames to an upright position for transporting said implement.

7. An implement according to claim 6 wherein said means for lifting includes a pair of hydraulic cylinders carried by said second frame and having rods coupled to said first and third frames for lifting said first and third frames upon actuation of said cylinders.

8. An implement according to claim 7 wherein said hydraulic cylinders are each coupled to said second frame by a laterally adjustable link whereby the lower operating position limit of said first and third frames relative to said second frame may be adjusted.

* * * * *